(12) United States Patent
Sundarraj et al.

(10) Patent No.: US 7,409,461 B2
(45) Date of Patent: Aug. 5, 2008

(54) DYNAMIC FILE-BASED ROUTING IN A BROADBAND COMMUNICATIONS SYSTEM

(75) Inventors: Akkamapet P. Sundarraj, Cupertino, CA (US); James R. Pickering, Leander, TX (US); Douglas Moe, San Jose, CA (US); Melvin Paul Perinchery, Sunnyvale, CA (US)

(73) Assignee: Efficient Networks, Inc., Dallas, TX (US)

( * ) Notice: Subject to any disclaimer, the term of this patent is extended or adjusted under 35 U.S.C. 154(b) by 749 days.

(21) Appl. No.: 10/289,098

(22) Filed: Nov. 6, 2002

(65) Prior Publication Data

US 2004/0034716 A1 Feb. 19, 2004

Related U.S. Application Data

(60) Provisional application No. 60/404,458, filed on Aug. 19, 2002.

(51) Int. Cl.
*G06F 15/16* (2006.01)
(52) U.S. Cl. .............. 709/242; 709/203; 709/217; 709/219; 709/220; 709/221; 709/222; 709/230; 709/232; 709/238; 709/239; 709/245; 369/44.34; 369/44.41; 455/228; 348/738; 711/E12.072
(58) Field of Classification Search ............ 709/242, 709/239, 238, 203, 217, 219, 220, 221, 222, 709/223, 224, 230, 232, 245; 369/44.34, 369/44.41; 455/228; 348/738; 711/E12.072
See application file for complete search history.

(56) References Cited

U.S. PATENT DOCUMENTS

| 6,341,516 B1 | 1/2002 | Narushima et al. | |
| 6,532,217 B1* | 3/2003 | Alkhatib et al. | 370/252 |
| 6,850,531 B1* | 2/2005 | Rao et al. | 370/401 |
| 7,054,910 B1* | 5/2006 | Nordin et al. | 709/208 |
| 2002/0004935 A1 | 1/2002 | Huotari et al. | |
| 2002/0044567 A1* | 4/2002 | Voit et al. | 370/467 |
| 2003/0110249 A1* | 6/2003 | Buus et al. | 709/224 |
| 2003/0172143 A1* | 9/2003 | Wakayama | 709/223 |
| 2004/0052257 A1* | 3/2004 | Abdo et al. | 370/392 |

FOREIGN PATENT DOCUMENTS

| JP | 10093630 A | 10/1998 |
| JP | 2002185521 A | 6/2002 |

* cited by examiner

*Primary Examiner*—Ario Etienne
*Assistant Examiner*—Barbara N Burgess

(57) ABSTRACT

Methods and systems consistent with the present invention provide broadband subscribers with dynamic, automatic routing information for accessing services offered by a service provider network (35) and/or content provider networks (40, 45). Client software on the subscriber's computer (10) retrieves a file such as an HyperText Markup Language (HTML) document from a predetermined server containing connection-oriented routing information for gaining access to various network services. The client software parses the HTML document and extracts the routing information. The client software then uses this routing information to populate and manipulate the subscriber computer (10) routing table.

23 Claims, 3 Drawing Sheets

| ROUTE TABLE | | | | |
|---|---|---|---|---|
| Network | Mask | Gateway | Interface | Metric |
| 10.10.10.0 | 255.0.0.0- | 10.10.10.1 | 1 | 1 |
| 192.168.1.0 | 255.255.0.0 1 | 92.168.1.1 | 2 | 1 |

| LINE # | INSTRUCTIONS |
|---|---|
| 1 | Polling Period Configuration (EFFICIENT.INI) |
| 2 | [Access] |
| 3 | RouteCheckInterval=10 |
| 4 | |
| 5 | Sample html page sent from server |
| 6 | <HTML> |
| 7 | <HEAD> |
| 8 | <META NAME="GENERATOR" Content="Microsoft Developer Studio"> |
| 9 | <META HTTP-EQUIV="Content-Type" content="text/html; charset=iso- |
| 10 | 8859-1"> |
| 11 | <TITLE>Document Title</TITLE> |
| 12 | </HEAD> |
| 13 | <BODY> |
| 14 | [Routes] |
| 15 | Route1=Add,205.87.72.0,255.255.255.0,205.87.72.1,1 |
| 16 | Route2=Add,206.87.72.0,255.255.0,206.87.72.1,1 |
| 17 | Route3=Delete,206.87.72.0,255.255.0,206.87.72.1,1 |
| 18 | DeleteDefaultRoute=0 |
| 19 | Version=3 |
| 20 | </BODY> |
| 21 | </HTML> |

FIG. 4

DYNAMIC FILE-BASED ROUTING IN A BROADBAND COMMUNICATIONS SYSTEM

CROSS-REFERENCES TO RELATED APPLICATIONS

This application is entitled to the benefit of Provisional Patent Application Ser. No. 60/404,458, filed on Aug. 19, 2002.

FIELD OF THE INVENTION

The present invention relates to communications systems, and more particularly to methods and systems for dynamically updating routing tables in a broadband communications system.

BACKGROUND

Routers route packets of data in and between networks, such as Transfer Control Protocol/Internet Protocol (TCP/IP) networks and the Internet. Routers use routing protocols and algorithms to map the topology of networks and then share that routing information with other routers. Routers store routing information in routing tables. If a network gets congested or a connection fails, a router uses the routing information in its routing table in an effort to find an alternate route.

Broadband communications systems present a number of unique routing challenges. Broadband subscribers are rarely sophisticated enough to manually update their own routing table. As a result, their routing tables are often outdated and ineffective. In addition, when broadband subscribers access multiple Point to Point over Ethernet (PPPoE) sessions and multiple service providers, conventional systems tend simply to promote the route that corresponds to the last active interface. This can confuse routers and cause packets to be unintentionally dropped.

One attempt to deal with the challenges discussed above is the PPPoE Active Discovery Network (PADN). PADN is an extension to PPPoE, which provides a standard method for building Ponint to Point (PPP) sessions and encapsulating PPP packets over Ethernet. PADN packets may include Internet Protocol (IP) routes that may be used by a Host, such as a Broadband Remote Access Server (BRAS) to populate it's routing table. Although PADN is an extension to PPPoE, it is not a standard and therefore many Hosts do not support PADN packets. In addition, utilization of PADN requires considerable manual oversight by a service provider, which can lead over time to unreliability.

SUMMARY OF THE INVENTION

With the foregoing in mind, methods and systems consistent with the present invention provide dynamic up-to-date routing information to broadband communications systems. Methods and systems consistent with the present invention are compatible with existing Host equipment and do not require manual oversight by a subscriber or service provider. In an exemplary embodiment, service providers and/or content providers maintain routing information in a standard HyperText Markup Language (HTML) file that is accessed by a subscriber's computer system. The subscriber's computer system parses the HTML file and extracts routing information to automatically populate it's routing table. The subscriber's computer system then periodically polls the HTML file for changes and automatically updates its routing table when new routing information is available.

These and other objects, features, and advantages in accordance with the present invention are provided in one embodiment by a method of providing routing information in a broadband communications system. The broadband communications system comprises a subscriber-data-processing system and at least one content-provider-data-processing system. The subscriber-data-processing system includes a client component of a broadband-access program. The method comprises the steps of (a) establishing at least one Point to Point over Ethernet (PPPoE) session between the subscriber-data-processing system and the at least one content-provider-data-processing system; (b) retrieving, by the client component on the subscriber-data-processing system, a file from a predetermined server containing routing information in a predetermined data format; (c) parsing, by the client component of the subscriber-data-processing system, the file to extract the routing information; and (d) populating, by the client component, a routing table on the subscriber-data-processing system based on the routing information.

In another embodiment, a system is provided for supplying routing information in a broadband communications system. The system comprises a subscriber-data-processing system including a client component of a broadband-access program; at least one content-provider-data-processing system for providing content to the subscriber-data-processing system via at least one Point to Point over Ethernet (PPPoE) session; means for providing the client component of the subscriber-data-processing system with a file from a predetermined server containing routing information in a predetermined data format; means for parsing the file to extract the routing information; and means for populating a routing table on the subscriber-data-processing system based on the routing information.

In another embodiment, a computer-readable medium is provided that contains instructions that cause a system to perform a method. The computer system includes a client program on a subscriber-computer system and a server program on a provider-computer system. The method comprises the steps of (a) establishing one or more Point to Point over Ethernet (PPPoE) sessions between the subscriber-computer system and the provider-computer system; (b) sending a file containing routing information in a predetermined data format from a predetermined server by the server program to the client program; (c) parsing, by the client program, the file to extract the routing information; (d) populating, by the client program, a routing table on the subscriber-computer system based on the routing information.

In yet another embodiment, a computer-readable memory device is provided that is encoded with a data structure for transferring data between a client program and a server program during a broadband communications session. The data structure has entries comprising routing information in a predetermined format, maintained by the server program and for use by the client program, for managing and updating a routing table.

BRIEF DESCRIPTION OF THE DRAWINGS

The invention is explained in more detail by way of example with reference to the following drawings:

FIG. 4 illustrates an HTML file consistent with an exemplary embodiment of the present invention.

DETAILED DESCRIPTION

Figures 1, 3:
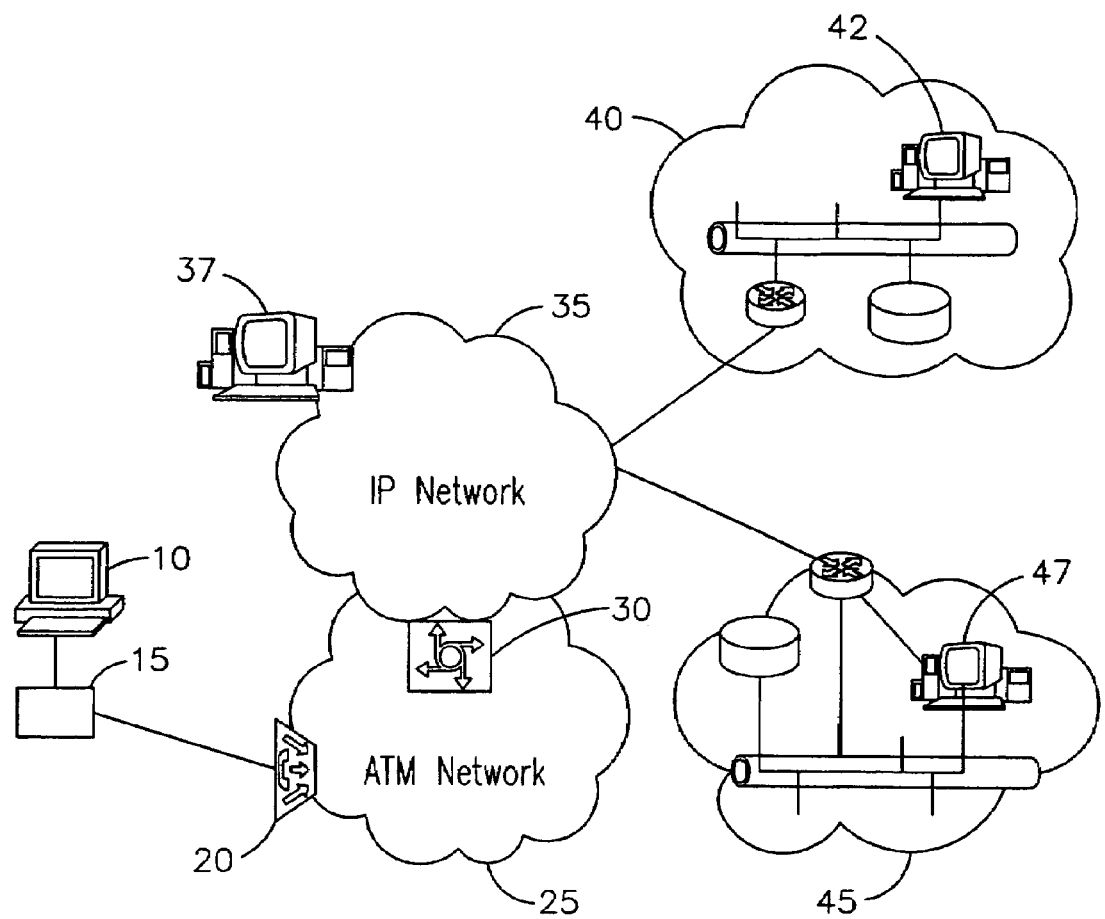
FIG. 1 illustrates a communications system consistent with the present invention.
FIG. 3 illustrates a route table consistent with the present invention.

FIG. 1 illustrates a broadband-communications system consistent with the present invention. The communications system includes a subscriber-data-processing system 10, such as a general-purpose computer or a mobile-computing device. The subscriber-data-processing system 10 is connected to a Digital-Subscriber-Line-Access Multiplexer (DSLAM) 20 through a Digital-Subscriber-Line (DSL) modem 15. An Asynchronous-Transfer-Mode (ATM) network 25, including a router or Broadband Remote Access server (BRAS) 30, provides a path to a service-provider network 35 and to content-provider networks 40, 45. The service-provider network 35 includes a service-provider data-processing system 37. The content-provider networks 40, 45 include content-provider-data-processing systems 42, 47.

Methods consistent with the present invention are implemented by a client component of broadband-access software (the "client component") residing on the subscriber's data-processing system 10 and by a server-component of broadband-access software (the "server component") on the service provider's data-processing system 37 and/or on one ore more content providers' data-processing systems 42, 47. The client component and the server component work together to establish and manage a subscriber's broadband connection.

Figure 2:
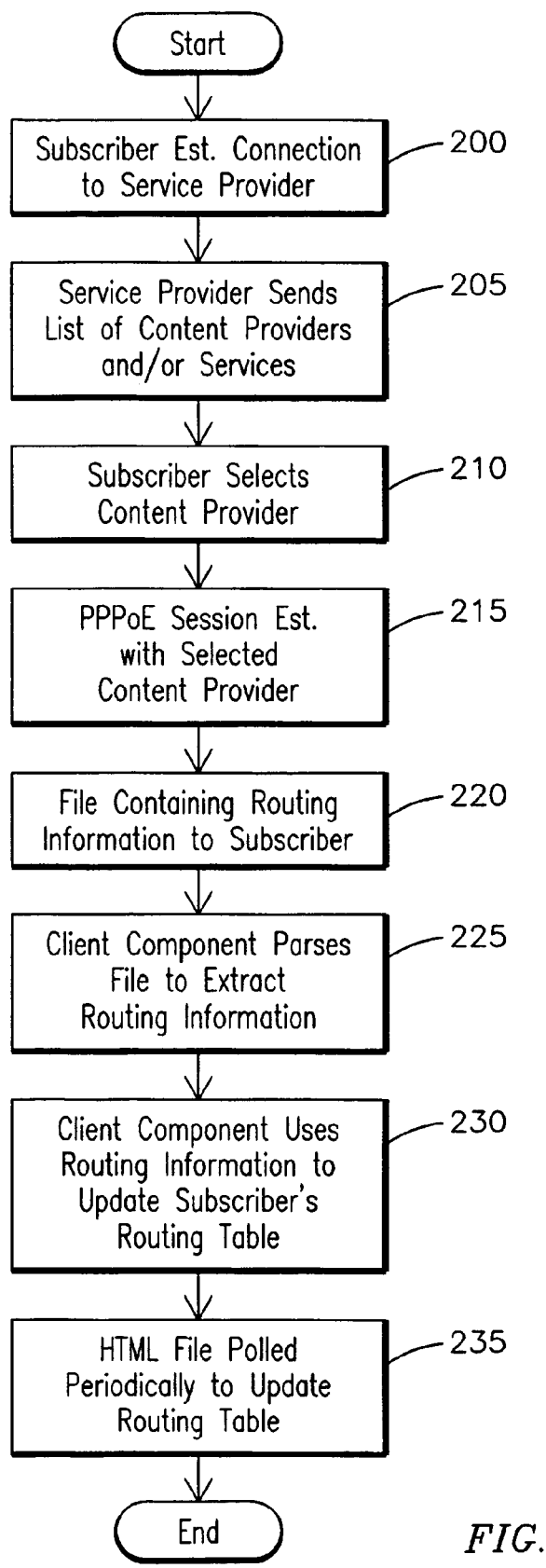
FIG. 2 is a flowchart illustrating steps of a method consistent with the present invention.

FIG. 2 is a flowchart illustrating the steps of an exemplary embodiment of the present invention. To establish broadband communications, a subscriber begins by directing the client component to establish a connection with a service provider. In response, the client component authenticates to the service provider's IP network and establishes a broadband connection to the service provider (step 200). Once a connection is established, the service provider provides the subscriber with information about available content providers and/or associated services (step 205). The subscriber then selects a desired content provider and/or service (step 210) and the client module establishes a PPPoE session with the selected-content provider/service (step 215). The content provider authenticates the subscriber. Upon successful authentication to the content provider, the content provider or the service provider sends the subscriber a file containing routing information for reaching the content provider (step 220). These steps may be repeated to establish connections with one or more additional content providers.

The file sent to the subscriber is set up and maintained by the content provider or the service provider. The file is stored by the content provider or service provider on a predetermined server in a predetermined format for access and use by a subscriber. One of skill in the art will appreciate that the predetermined format may be any data format suitable for conveying routing information to a subscriber. Examples include, but are not limited to, markup languages such as HyperText Markup Language (HTML), Extensible Markup Language (XML), and Standard Generalized Markup Language (SGML).

When the client component on the subscriber's data-processing-system receives the file containing routing information in a predetermined data format, the client component parses the content of the file to extract the routing information (step 225) and then updates the subscriber's routing table based on that routing information (step 230). The client component then periodically polls the file to determine if its contents have changed and, if they have, the client component updates the subscriber's routing table accordingly (step 235).

FIG. 3 illustrates a typical routing table. Routing tables are well-known. The routing table illustrated in FIG. 3 includes a first column, entitled "Network," listing IP addresses corresponding to network address of content providers. The second column, entitled "Mask," provides sub-net addresses corresponding to content providers. The third column, entitled "Gateway," provides addresses of gateways (or routers) that provide access to content-provider networks. Column four, entitled "Interface," identifies interfaces (or virtual adapters) associated with content providers. Column five, entitled "Metric," specifies which interface to promote first.

FIG. 4 illustrates a list of HTML instructions from an exemplary HTML file consistent with the present invention. The HTML file contains routing information for populating a subscriber's routing table. The client component on the subscriber's data-processing-system parses the content of the HTML file to extract the routing information and then updates the subscriber's routing table accordingly. As shown in FIG. 4, the file may include both route-related and non-route-related instructions. The route-related instructions may include, for example, instructions for manipulating aspects of the subscriber's routing table. In the HTLM file shown in FIG. 4, for example, lines 1 through 3 define the polling period for the HTML file. The polling period instructs the client component to poll the HTML file at a specified time interval. In this case, the time interval is specified as ten minutes. Lines 4 through 13 include generic HTML instructions not related to the present invention. Line 14 is an HTML section header that identifies the beginning of routing information. Lines 15 and 16 instruct the client component to add two specific routes, 205.87.72.0, 255.255.255.0, 205.87.72.1,1 and 206.87.72.0, 255.255.255.0, 206.87.72.1, 1, to the subscriber's routing table. Line 17 instructs the client component to delete a route, 206.87.72.0, 255.255.255.0, 206.87.72.1,1, from the subscriber's routing table. Line 18 instructs the client component not to delete the default route in the subscriber's routing table by specifying a DeleteDefaultRoute value of 0. A DeleteDefaultRoute value of 1 would instruct the client component to delete the default route. Line 19 specifies a Version identifier of 3. This Version identifier is used by the client component to determine whether the HTML file has changed since the last time the client component accessed the file. The client component periodically polls the HTML file for updated content by comparing the current Version identifier with the Version identifier for the last HTML-routing-file accessed. If the Version number has changed, the client component uses the new HTML-routing-file to update the subscriber's routing table to reflect the more current routing information.

The present invention has been described with reference to the accompanying drawings that illustrate preferred embodiments of the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. Thus, the scope of the invention should be determined based upon the appended claims and their legal equivalents, rather than the specific embodiments described above.

What is claimed is:

1. A method of obtaining routing information by a client component, in a broadband communications system comprising a subscriber-data-processing system and at least one content-provider-data-processing system, and said subscriberdata-processing system includes a client component of a broadband-access program, the method comprising:

establishing at least one Point to Point over Ethernet (PP-PoE) session between said subscriber-data-processing system and said at least one content-provider-data-processing system;

retrieving a file from a predetermined server, said file containing routing information in a predetermined data format and having a version identifier, the routing information effective to access said at least one content-provider-data-processing system, the file maintained by at least one content-provider;

parsing said file to extract said routing information;

populating a routing table on said subscriber-data-processing system based on said routing information;

periodically polling said file from said predetermined server in order to re-retrieve said file; and repopulating said routing table based on said routing information re-retrieved by periodic polling when said version identifier of said re-retrieved file is different than said version identifier used in populating said routing table.

2. The method of claim 1 wherein said predetermined data format is a markup language.

3. The method of claim 2 wherein said predetermined data format is a markup language selected from the group consisting of HyperText Markup Language (HTML), Extensible Markup Language (XML), and Standard Generalized Markup Language (SGML).

4. The method of claim 1 wherein said file further contains an instruction to delete a default route in said routing table.

5. The method of claim 1 wherein said predetermined server is a server maintained by said content provider.

6. The method of claim 1 wherein said predetermined server is a server maintained by a service provider providing a broadband communications connection to said subscriber.

7. The method of claim 1 wherein said file further contains an instruction indicating how to populate said routing table using at least part of said routing information.

8. The method of claim 7 wherein said instruction indicates to add a route in said routing table.

9. The method of claim 7 wherein said instruction indicates to delete a route in said routing table.

10. The method of claim 1 wherein said file contains a plurality of instructions on populating said routing table.

11. A computer-readable medium containing instructions that when executed by a computer system causes said computer system to perform a method, said computer system including a client program on a subscriber-computer system and a server program on a provider-computer system, the method comprising: establishing one or more Point to Point over Ethernet (PPPoE) sessions between said subscriber-computer system and said provider-computer system;

by said subscriber-data-processing system:

retrieving a file by said client program from a server program, said file containing and a version identifier, the routing information in a predetermined data format from a predetermined server the routing information effective to access a provider-data-processing system;

parsing, by said client program, said file to extract said routing information;

populating, by said client program, a routing table on said subscriber-computer system based on said routing information; and periodically polling said file from said predetermined server in order to re-retrieve said file; and repopulating said routing table based on said routing information when the version identifier indicates the said file has changed.

12. The computer-readable medium of claim 11 wherein said predetermined data format is a markup language.

13. The computer-readable medium of claim 11 wherein said file includes an instruction for adding a route in said routing table.

14. The computer-readable medium of claim 11 wherein said file includes an instruction for deleting a route in said routing table.

15. The computer-readable medium of claim 11 wherein said file includes an instruction for deleting a default route in said routing table.

16. The computer-readable medium of claim 11 wherein said predetermined server is a server maintained by a service provider.

17. The computer-readable medium of claim 11 wherein said predetermined server is a server maintained by a content provider.

18. A method of obtaining routing information by a client component, wherein in a broadband communications system comprising a subscriber-data-processing system and at least one content-provider-data-processing system, and wherein said subscriber-data-processing system includes a client component of a broadband-access program, the method comprising:

by said subscriber-data-processing system:

retrieving a file from a predetermined server, said file containing routing information in a predetermined data format and at least one instruction, the routing information effective to access at least one content-provider-data-processing system, the file is maintained by at least one content-provider-data-processing system;

parsing said file to extract said routing information; and populating a routing table with said routing information on said subscriber-data-processing system based on said instruction, wherein the instruction indicating how to populate said routing table with at least part of the routing information;

wherein said file contains a version identifier;

periodically polling to receive a second file having a version identifier from said predetermined server; and repopulating said routing table when first version identifier is different than the second version identifier.

19. The method of claim 18 wherein said data format is a markup language.

20. The method of claim 19 wherein said predetermined data format is a markup language selected from the group consisting of HyperText Markup Language (HTML), Extensible Markup Language (XML), and Standard Generalized Markup Language (SGML).

21. The method of claim 18 wherein the instruction indicates to add a route in said routing table.

22. The method of claim 18 wherein the instruction indicates to delete a route in said routing table.

23. The method of claim 18 wherein the instruction indicates to delete a default route in said routing table.

* * * * *